United States Patent [19]

Morgan et al.

[11] Patent Number: 4,836,961
[45] Date of Patent: Jun. 6, 1989

[54] METHOD OF AND APPARATUS FOR CASTING SOLID PROPELLANT ROCKET MOTORS

[75] Inventors: Richard E. Morgan, Huntsville; Charles B. Dye, Albertville, both of Ala.

[73] Assignee: Morton Thiokol, Inc., Chicago, Ill.

[21] Appl. No.: 288

[22] Filed: Jan. 2, 1987

[51] Int. Cl.⁴ .............. C06B 21/00; C06B 45/00; F02K 9/00
[52] U.S. Cl. .................. 264/3.1; 60/253; 60/255; 86/1.1; 86/20.1; 86/20.12; 86/20.14; 102/287; 102/289; 102/290; 102/291; 149/109.6; 264/3.3; 425/DIG. 15; 425/DIG. 43
[58] Field of Search ............. 102/287, 289, 290, 291; 264/3.1; 149/109.6; 425/89, DIG. 15, DIG. 43, 468; 86/20.12, 1.1, 20.14, 20.1; 60/253, 250, 255, 256

[56] References Cited

U.S. PATENT DOCUMENTS

| | | | |
|---|---|---|---|
| 3,186,035 | 6/1965 | Grace | 86/20.12 |
| 3,451,104 | 6/1969 | Andrepont | 86/20.14 |
| 3,726,182 | 4/1973 | Fichter | 86/1.1 |
| 3,890,877 | 6/1975 | Lista et al. | 86/1.1 |
| 3,911,823 | 10/1975 | Murray et al. | 102/204 |
| 3,951,706 | 4/1976 | Eldridge | 149/19.8 |
| 3,952,627 | 4/1976 | Gardiner et al. | 86/1.1 |
| 3,967,527 | 7/1976 | Dunn et al. | 86/20.12 |
| 4,000,682 | 1/1977 | Thibodaux, Jr. et al. | 86/1.1 |
| 4,103,584 | 8/1978 | Lista et al. | 86/1.1 |
| 4,298,552 | 11/1981 | Gimler | 264/3.1 |
| 4,577,542 | 3/1986 | O'Driscoll | 86/20.12 |

Primary Examiner—Howard J. Locker
Attorney, Agent, or Firm—Gerald K. White

[57] ABSTRACT

A method of and apparatus for casting uncured solid propellant in solid propellant rocket motors includes a casting bayonet having annular slits formed in the exit end thereof that improve the fluidity and self-leveling behavior of the uncured propellant. Both of these effects eliminate or reduce the trapping of air in the cast propellant, thus providing a better product.

10 Claims, 2 Drawing Sheets

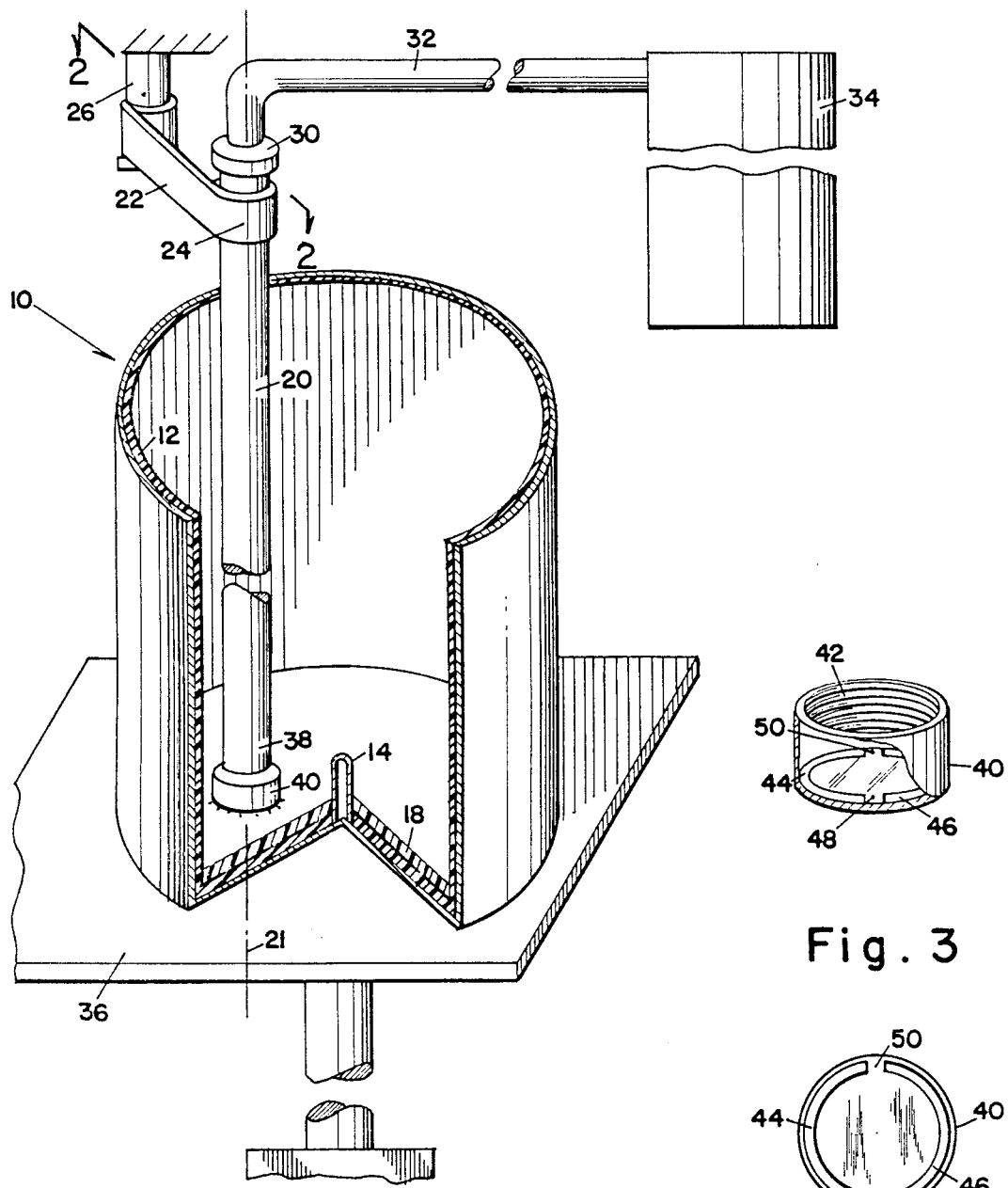
Fig. 1
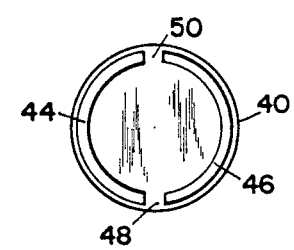
Fig. 3
Fig. 4
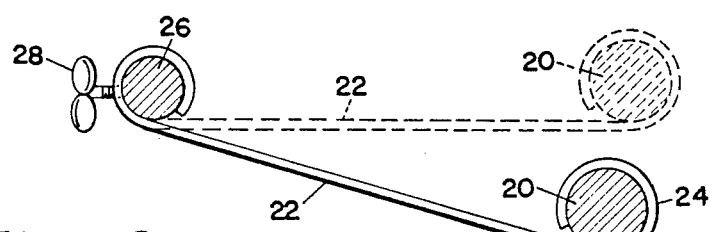
Fig. 2

METHOD OF AND APPARATUS FOR CASTING SOLID PROPELLANT ROCKET MOTORS

BACKGROUND OF THE INVENTION

1. Field of the Invention

This invention relates to an improved method of and apparatus for casting solid propellant rocket motors where the solids and liquids of the propellant are mixed although uncured prior to loading in a motor. The invention is particularly useful in casting small tactical solid propellant rocket motors typically containing 100 pounds or less of propellant.

2. Description of the Prior Art

Various forms of apparatus for use in casting uncured propellant in the motor case of a solid propellant rocket motor are known in the prior art. One such apparatus, as disclosed in U.S. Pat. 3,186,035 granted on June 1, 1965 to G. K. Grace and assigned to the assignee of the present invention, includes a core and surrounding barrier sleeve that are concentrically positioned within the motor case. The apparatus is intended for use in large motors such as a monolithic shuttle booster containing 100,000 pounds of propellant or more, and involves pulling of the core during motor loading. When the core and barrier are in position, the uncured propellant is cast into the motor case by means of a casting bayonet. The casting bayonet disclosed is of a type known in the art as a "fire hose bayonet." This bayonet allows propellant to flow around the core but does not place the propellant uniformly around the core. That is to say, the propellant must flow from where it is deposited to the other side of the core.

U.S. Pat. No. 3,726,182 granted on Apr. 10, 1973 to K. L. Fichter discloses a method of loading a fluid explosive into a mold using a nozzle comprising a conduit connected at a first end to a flexible hose and terminating at a second end with an externally actuated poppet valve. The poppet valve includes an actuating rod that extends through a restricted orifice in the second end of the conduit. When the conduit is in an upright position with the actuating rod fully extended downward, the orifice is closed. Engagement of the lower end of the actuating rod with an obstruction in the munition causes it to be moved upwards through the conduit. This opens the restricted orifice, forming an annular passage for the flow of molten explosive.

A number of problems would be encountered if it were attempted to use such a poppet valve arrangement in the casting of uncured propellant for use in solid propellant rocket motors. The actuating rod of the valve would have to contact the bottom of the motor case. This could damage the case interior or tooling situated in the case. In addition, the actuating rod could damage a liner or other coating on the bottom of the case where there is contact with the rod. Additionally, the uncured propellant must flow down the actuating rod. This could produce voids or porosity in the slurry as the propellant material could stack and fold over as it rolls down the actuating rod. Also, in order to cast a void free solid propellant motor, it has been found that the propellant surface in the motor must remain in contact with the end of the casting bayonet. In other words, either the bayonet or the motor must be retracted during casting in order to maintain the propellant surface in the motor in contact with the end of the bayonet. This is not feasible with the poppet valve arrangement of U.S. Pat. No. 3,726,182.

Thus, there exists a need and a demand for improvement in the method of and apparatus employed in the prior art for casting uncured propellant in solid propellant rocket motors to the end of achieving uniform, void free placement of the propellant in the motor with no possibility of damage to the motor case interior including a liner or other coating or tooling therein. The present invention was devised to fill the technological gap that has existed in the art in this respect.

SUMMARY OF THE INVENTION

An object of the invention is to provide an improved method of and apparatus for casting uncured solid propellant in solid propellant rocket motors that facilitates the uniform placement therein of void free propellant.

Another object of the invention is to provide an improvement in a bayonet for casting uncured solid propellant in solid propellant rocket motors that facilitates placement of propellant cast through the bayonet around an obstruction in a motor case.

A more specific object of the invention is to provide such an improved bayonet that may be constructed from standard polyvinyl chloride (PVC) pipe and fittings, and hence, made cheaply enough to be disposable thus eliminating the cost and hazard of cleanup after casting.

In accomplishing these and other objectives of the invention, there is provided a bayonet consisting of a piece of pipe or tubing in which the end is modified so that a fluid exiting the pipe passes through a small generally annular slit-like opening when pressurized. Specifically, a flow restrictor which may comprise a standard pipe fitting cap having annular openings cut therein is placed over the exit end of the bayonet.

Also, in accordance with the invention, the surface of the propellant or other fluid as it is being loaded into a motor case or other container is maintained in contact with the end of the bayonet, with the bayonet or motor case, or container, being retracted during loading in order to maintain such contact.

Non-Newtonian Power law fluids, which include uncured propellants for use in solid propellant rocket motors, become more fluid flowing through a thin slit than a circular opening. This improves the fluidity and self-leveling behavior of the fluid. Both of these effects eliminate or reduce the trappings of air in the cast fluid, providing a void free, and thus, better propellant product.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying figures of drawing which form part of the specification, in which like parts are designated by the same reference numbers, and of which:

FIG. 1 is a fragmentary sectional perspective view, partly broken away of apparatus, including a bayonet modified according to the invention and positioned in a motor case, for casting a solid propellant rocket motor;

FIG. 2 is a view taken on lines 2—2 of FIG. 1, illustrating an adjustable bracket for supporting the bayonet;

FIG. 3 is a sectional perspective view of a pipe cap in which annular slit-like openings are cut and which is attached to the exit end of the bayonet of FIG. 1 for improving the fluidity and self-leveling behavior of the propellant;

FIG. 4 is a bottom view of the pipe cap of FIG. 3 showing the annular slits therein in greater detail;

DESCRIPTION OF THE PREFERRED EMBODIMENT

Figure 6:
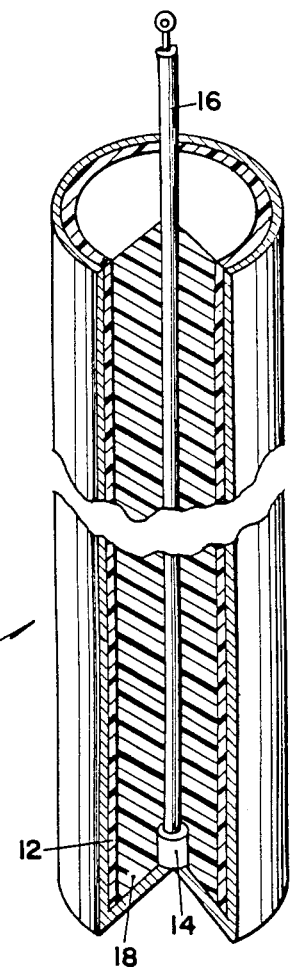
FIG. 6 is a fragmented sectional perspective view of a solid propellant rocket motor after loading of uncured propellant therein and showing a cylindrical core means as having been introduced longitudinally and centrally thereof and as having the inner end inserted in the receptacle in the bottom of the motor.

Referring to the drawings, the reference numeral 10 designates a portion of a motor case for a solid propellant rocket motor. An elastomeric lining 12 is attached in any suitable manner to the interior side walls and bottom of the motor case 10. Centrally located on the bottom of the case, interiorly thereof, is a short tubular receptacle 14. Receptacle 14 is provided for receiving the end of an elongated core means 16, as illustrated in FIG. 6.

When the motor case 10 has been loaded with uncured propellant, as hereinafter described, core means 16 is pushed down through the propellant and into the receptacle 14. This is done to form a central longitudinal configuration in the uncured propellant 18, which configuration will be retained during the curing process. A mold and releasing lubricant, as known in the art can be applied to the core means 16 to minimize the friction between the core means 16 and the propellant 18 thereby to facilitate the withdrawal of the core means 16 from the propellant 18 after the latter has been cured.

Figure 5:
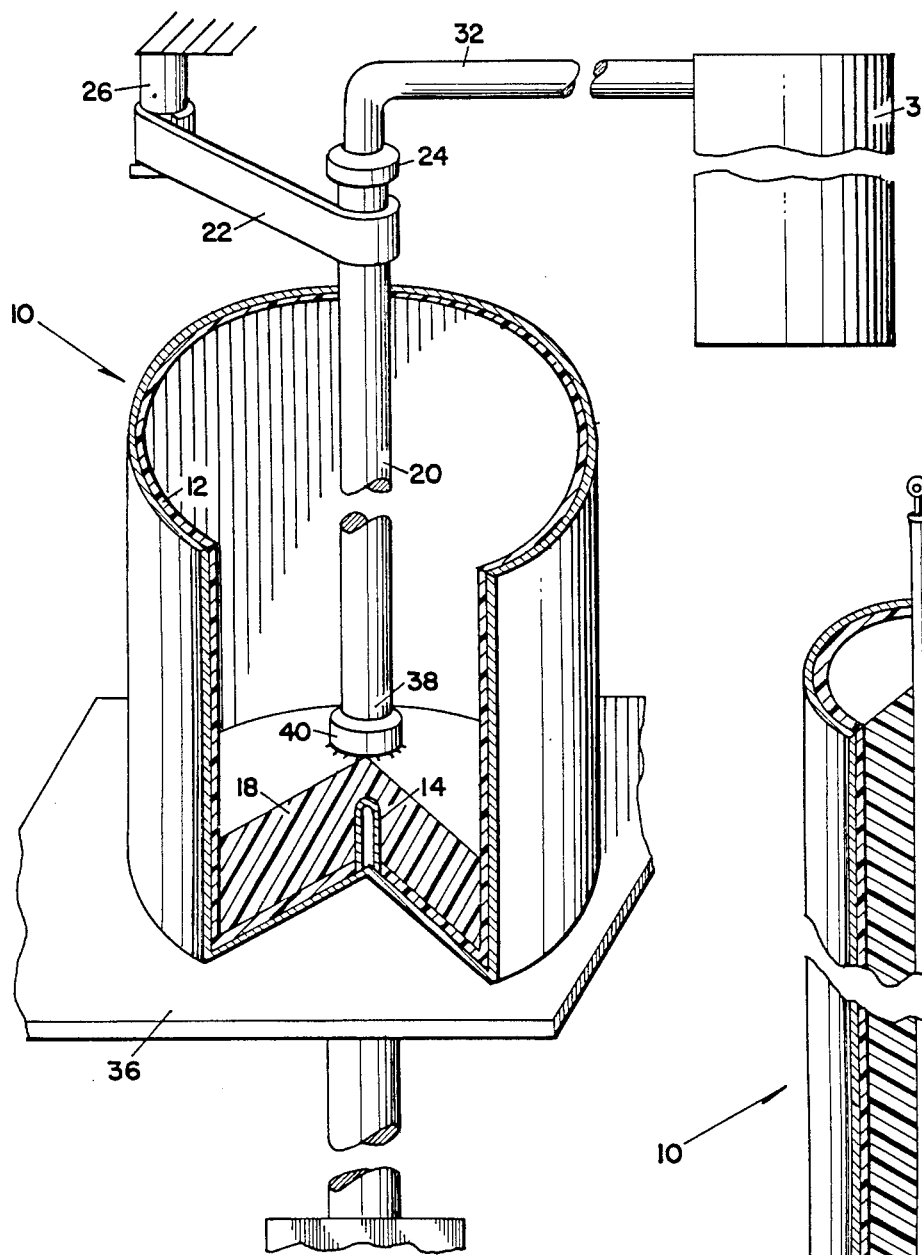
FIG. 5 is a fragmented sectional perspective view similar to FIG. 1 for casting a solid propellant rocket motor in which the bayonet has been shifted to a central location within the motor case.

As shown in FIGS. 1 and 5, uncured propellant 18 is cast in the motor case by means of an elongated casting bayonet 20 having a longitudinal axis 21. In one embodiment of the invention, bayonet 20 is supported at its upper end by a rotatably adjustable bracket 22, being fixedly attached thereto by a clamp 24. Bracket 22 is mounted for limited rotation on a stationary vertically positioned rod 26, being held thereby in a fixed vertical position.

In a first rotatably adjusted position of bracket 22, bayonet 20 is held vertically suspended in motor case 10 in a position between the tubular receptacle 14 and the inner side wall of motor case 10, as shown in FIG. 1. In a second adjusted position of bracket 22, bayonet 20 is held vertically suspended in motor case 10 in a central position thereof, as shown in FIG. 5. Suitable means, such as a wing nut 28, may be provided for retaining bracket 22 in each of its rotatably adjusted positions.

Uncured propellant 18 is delivered under pressure to a first end 30 of bayonet 20 by a flexible conduit 32 from a source 34 of uncured propellant. Typically, the pressure at which uncured propellant is delivered to the first end 30 of bayonet 20 may be in the range of 20–80 psig. The means for providing such pressure have not been shown in order to avoid undue complication of the drawings.

Initially, during the loading of the motor case 10, the bayonet 20 is fully suspended therein with the adjustable bracket 22 in the first adjusted position thereof. The inner or second end 38 of the bayonet 20 is then positioned between the tubular receptacle 14 and the inner side walls of the motor case 10.

As schematically illustrated in FIGS. 1 and 5, the motor case 10 is mounted on and supported by an elevator 36. Elevator 36 may be of any suitable known type, for example, a direct acting hydraulic cylinder or a winding drum type. During casting, with the bayonet 20 being held fixed in position, elevator 36 is operated by manual or automatic means (not shown), as desired, initially to lift motor case 10 into operative relationship with bayonet 20 with the lower end of the bayonet 20 disposed between the receptacle 14 and the inner side walls of motor case 10. As propellant 18 is introduced into motor case 10 through bayonet 20 and the level of propellant 18 in motor case 10 rises, elevator 36 is operated to lower the motor case 10 at substantially the same rate at which the level of propellant 18 rises in the motor case 10. As a result, the inner or second end 38 is continuously maintained in contact with the surface of the propellant during the loading of the motor case 10, with propellant 18.

The elevator 36 per se and the means per se, manual or automatic, for controlling its operation to lower the motor case 10, as the level of the propellant therein rises, to maintain the end 38 of the bayonet 20 in contact with the surface of the propellant 18 forms no part of the present invention, and hence, will not further be described herein.

When the level of the propellant 18 rises above the tubular receptacle 14, the adjustable bracket 22 is adjusted to the second position thereof. This produces a lateral shift in the position of the bayonet 20 so that it is located substantially coaxially with the motor case 10 with the second end 36 in contact with the surface of the propellant 18 at a central area thereof. The bayonet 20 is maintained in this position of coaxial relationship with the motor case 10 during the remainder of the propellant loading operation.

It is noted that in a second embodiment of the invention the adjustable bracket 22 is omitted. In such case the lateral shift in position of the vertically suspended bayonet 20 in motor case 10 may be effected simply by adjustment in the position of the motor case 10 on the elevator 36. Also, the conduit 32 connecting the bayonet 20 to the propellant source 34 may then be made rigid. Such rigid convection by itself may provide the support necessary to maintain the bayonet fixed in an upright position. If desired, however, additional support means (not shown) for the bayonet 20 may be provided at the upper or propellant entry end thereof.

Attached to and forming the second end 38 of bayonet 20 is a pipe cap. Pipe cap 40 may be attached to the end 38 of bayonet 20 in any suitable manner, as for example, by screw thread means 42, as shown in FIG. 3.

As best seen in FIGS. 2 and 3, small slit-like openings 44 and 46 are cut into the bottom of pipe cap 40. Slits 44 and 46 are each annular in shape, are of the same size, and are evenly displaced from each other at both ends on the same circle, which circle is disposed transversely of the longitudinal axis of bayonet 20. Propellant 18 exiting the second end 38 of bayonet 20 must pass through these annular slit-like openings 44 and 46. Pipe cap 40 forms a flow restrictor, pressure of the propellant within the bayonet 20 being required to effect passage of propellant through the annular openings 44 and 46.

Propellant 18, being a non-Newtonian Power Law fluid, becomes more fluid flowing through the thin annular slits 44 and 46 than it would flowing through a circular opening. This improves the fluidity and self-leveling behavior of the propellant 18, causing it to flow uniformly around the tubular receptacle 14 when the second end 38 of bayonet 20 is positioned between receptacle 14 and the inner side wall of motor case 10. When laterally shifted in position, the bayonet 20, with the annular slits 44 and 46 in the end 38 thereof, places the propellant uniformly around the center area of the motor case 10 except for the small uncut regions 48 and 50 in the bottom of the pipe cap.

Thus, the bayonet 20 with the annular slits 44 and 46 in the end 38 thereof facilitates the uniform placement of propellant 18 in motor case 10 about the tubular receptacle 14, which receptacle 14 comprises an obstruction therein, and also the uniform placement of propellant in the motor case 10 in the region above the receptacle 14.

By way of illustration and not limitation, it is noted that in an operative embodiment of the invention employed for small tactical motor casting where the length of the motor casing is about 3½ feet and the diameter thereof is about 9 to 12 inches, the bayonet 20 is made from standard PVC pipe and the pipe cap 40 is a standard PVC pipe fitting. The pipe cap has a nominal 2 inch diameter with the annular slits 44 and 46 being of substantially the same size and disposed on a radius of ¾th of an inch, with the width of each slit being ⅛th of an inch. The length of each of the slits 44 and 46 in the direction of propellant flow therethrough is the thickness of the cap 40 which may be between ⅛th inch to ¼th inch.

When constructed from standard PVC pipe and fittings, the bayonet 20 is cheap enough to be disposable. This eliminates the cost and hazards of cleanup after casting.

When the motor case 10 has been loaded with propellant 18, it is relatively shifted laterally with respect to the bayonet 20 to allow the core means 16, as shown in FIG. 6 to be pushed down through the propellant 17 into the tubular receptacle 14. The loaded propellant 18 is then cured in known manner, following which cure the core means 16 as withdrawn, as described previously herein, to leave an opening coincident with the longitudinal axis of the motor case 10. In FIG. 6 the shape of the core means is shown to be cylindrical. Thus, the opening formed in the cured propellant 18 in motor case 10 is cylindrical. It will be understood, however, that, if desired, the cross section of the core means may have a configuration other than cylindrical thereby to form a correspondingly shaped opening in the cured propellant.

Thus, in accordance with the invention, there has been provided an improved method of and apparatus for casting uncured solid propellant in solid propellant rocket motors that facilitates the uniform placement therein of void free propellant. Additionally, there has been provided an improvement in bayonets for casting uncured solid propellant in solid propellant rocket motors that facilitates the placement of propellant through the bayonet around an obstruction in a rocket motor case. In addition, there has been provided such an improved bayonet that may be constructed from standard PVC pipe and pipe fittings, and therefore, made cheaply enough to be disposable, eliminating the cost and hazard of cleanup after casting.

With this description of the invention in detail, those skilled in the art will appreciate that modifications may be made to the invention without departing from the spirit thereof. Therefore, it is not intended that the scope of the invention be limited to the specific embodiments illustrated and described. Rather, it is intended that the scope of the invention be determined by the scope of the appended claims.

What is claimed is:

1. A method of casting a solid propellant rocket motor, said motor including a casing having a bottom with a short tubular receptacle therein for receiving the end of a core member, comprising the steps of:
   (a) introducing uncured propellant under pressure into said motor casing through a bayonet arranged in an upright position and having at least one thin slit formed in an exit end thereof with said exit end placed between said tubular receptacle and the wall of said casing, the uncured propellant in passing through said thin slit in the exit end of said bayonet becoming more fluid thereby improving the fluidity and self-leveling behavior of the propellant, whereby the propellant flows more uniformly around said tubular receptacle and minimizes any tendency for the trapping of air in the propellant and the formation of voids therein,
   (b) shifting the relative positions of said motor casing and said bayonet such that said bayonet is in an upright position with the exit end thereof positioned centrally of said motor casing when the level of the propellant therein rises above the tubular receptacle whereby to cause said propellant to be placed uniformly around the central area of the propellant in the motor casing,
   (c) relatively retracting said bayonet and motor casing as the level of propellant rises in the motor casing as required to maintain the exit end of said bayonet continually in engagement with the surface of said propellant whereby to minimize any tendency for the trapping of air and the formation of voids in said propellant,
   (d) introducing an elongated core member through the uncured propellant when the motor casing is filled with uncured propellant, such introduction being substantially coincident with the central axis of the motor casing with the inner end of said core member inserted into said tubular receptacle on the bottom of the motor casing,
   (e) curing said propellant in said motor casing with said core member therein, and
   (f) withdrawing said core member from the cured propellant in said motor casing.

2. A method as defined by claim 1 wherein said bayonet has two thin slits formed in the exit end thereof.

3. A method as defined by claim 2 wherein each of said thin slits in the exit end of said bayonet are annular in shape with the slits having substantially the same radius and displaced from each other on the same circle.

4. A method as defined by claim 3 wherein said slits are of substantially the same size.

5. A method as defined by claim 1 wherein said bayonet has an entry end for uncured propellant and is supported at said entry end by an adjustable bracket having a first position in which the exit end of said bayonet is positioned between said tubular receptacle and the wall of said casing and a second position in which the exit end of said bayonet is positioned centrally of said motor casing.

6. A method as defined by claim 1 wherein the shift in the relative positions of said bayonet and said motor casing is effected by laterally moving said motor casing with respect to the position of said bayonet.

7. A method as defined by claim 1 wherein said motor casing is positioned on an elevator and the relative retraction of the bayonet and motor casing as the level of propellant rises in the motor casing is effected by maintaining said bayonet fixed in position and lowering said elevator.

8. A method as defined by claim 1 wherein said bayonet has two thin slits formed in the exit end thereof with each of said slits being annular in shape, substantially the same size, and displaced from each other on the same circle,
   wherein the shift in the relative positions of said bayonet and said motor casing is effected by laterally moving said motor casing with respect to the position of said bayonet, and
   wherein said motor casing is positioned on an elevator and the relative retraction of the bayonet and motor casing as the level of propellant rises in the motor casing is effected by maintaining said bayonet fixed in position and lowering said elevator, the lateral shift in the relative positions of said bayonet and motor casing being effected by laterally shifting said motor casing on said elevator.

9. Apparatus for casting a solid propellant rocket motor, said motor including a motor casing having a bottom with a short tubular receptacle therein for receiving the end of a core member, comprising, a core member,
   a source of uncured propellant under pressure,
   a bayonet for casting uncured propellant in said motor casing, said bayonet having an entry end and an exit end, and having a longitudinal axis,
   conduit means connecting said entry end of said bayonet to said source of uncured propellant,
   means rigidly supporting said bayonet in upright position with respect to said motor casing with the exit end of said bayonet initially placed between said tubular receptacle and the inner side wall of said motor casing,
   means forming a plurality of annular slits in the exit end of said bayonet, said annular slits being of substantially the same size and being evenly displaced from each other on the same circle, which circle is positioned transversely of the longitudinal axis of said bayonet, and
   elevator means on which said motor casing is supported for lowering said motor casing with respect to said bayonet as the level of uncured propellant introduced into said casing through said bayonet rises thereby to continuously maintain the end of said bayonet in contact with the surface of said propellant, said motor casing being laterally shiftable in position on said elevator means to allow the exit end of said bayonet to be centrally positioned within said motor casing when the level of propellant therein rises above said tubular receptacle,
   whereby uncured propellant passing through said annular slits in the end of said bayonet becomes more fluid thereby improving the fluidity and self-leveling behavior of the propellant, and the propellant flows more uniformly around said tubular receptacle and flows more uniformly with improved self-leveling within said motor casing when the exit end of said bayonet is centrally positioned therein thereby minimizing any tendency for the trapping of air in the propellant as cast and the formation of voids therein,
   a central longitudinal configuration being formed in the rocket motor by the insertion of said core member into said tubular receptacle down through the propellant cast in said motor casing, said core member being retained in said motor casing during curing of said uncured propellant but thereafter being withdrawn.

10. Apparatus as defined by claim 9 wherein said bayonet is made of polyvinyl chloride pipe and the annular slits in the exit end thereof are cut in a polyvinyl chloride pipe cap that is attached to the end of the polyvinyl chloride pipe.

* * * * *